United States Patent [19]

Lin

[11] Patent Number: 6,062,145
[45] Date of Patent: May 16, 2000

[54] PORTABLE COMPUTING WORK PLATFORM FOR VEHICLE OPERATORS

[76] Inventor: Edward D. Lin, 556 Roxbury Ave., NW., Massillon, Ohio 44646-3281

[21] Appl. No.: 08/494,335

[22] Filed: Jun. 26, 1995

[51] Int. Cl.[7] ................................................. A47B 37/00
[52] U.S. Cl. .......................................... 108/44; 248/447.1
[58] Field of Search .................... 108/44, 152; 248/447.1

[56] References Cited

U.S. PATENT DOCUMENTS

| | | | |
|---|---|---|---|
| 3,643,606 | 2/1972 | Vise | ........................................... 108/44 |
| 3,952,988 | 4/1976 | Easterly . | |
| 4,726,607 | 2/1988 | White . | |
| 4,909,159 | 3/1990 | Gonsoulin . | |
| 4,974,805 | 12/1990 | Douglas . | |
| 5,177,665 | 1/1993 | Frank et al. . | |

FOREIGN PATENT DOCUMENTS 0357953  12/1961  Switzerland ......................... 248/447.1

*Primary Examiner*—Peter M. Cuomo
*Assistant Examiner*—Jerry A. Anderson
*Attorney, Agent, or Firm*—Renner, Kenner, Greive, Bobak, Taylor & Weber

[57] ABSTRACT

A new and improved portable computing work platform for a vehicle comprises a planar desk surface having a support ledge to support a laptop computer and a wrist rest at its lower end, and a header piece at its upper end configured to secure to a sector of a steering wheel. The platform has variable tilt control means on its underside comprising a bar that frictionally engages in between uniformly spaced and horizontally aligned ribs extending from bilateral side flanges and connected to the under side of the desk surface.

7 Claims, 7 Drawing Sheets

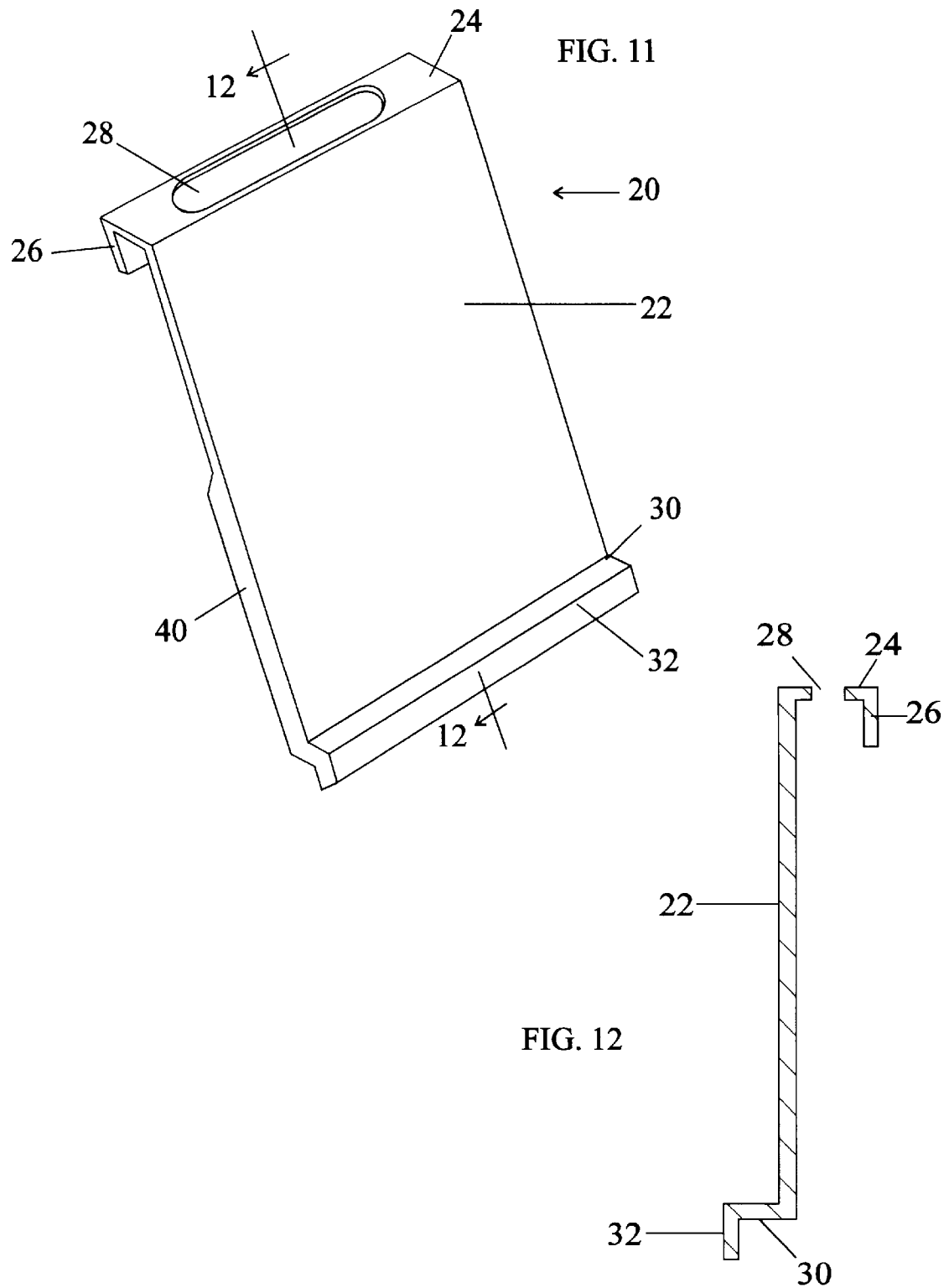

PORTABLE COMPUTING WORK PLATFORM FOR VEHICLE OPERATORS

BACKGROUND OF THE INVENTION

1. Field of the Invention

This invention relates to portable work platforms for use in vehicles and to a work platform for portable computing devices in particular.

Millions of professionals conduct business from their vehicles using their laptop computers, electronic tablets, personal digital assistants or other similar devices. Frequently, this entails accessing information before or entering information after a sales or service call. Unfortunately, there is no convenient means to use a laptop computer in the car while in the driver's seat. When a laptop computer is placed against the steering wheel, it slides right off unless one or both hands of the user provide the necessary support. This does not leave the hands free to work on the keyboard and is unsatisfactory. Thus, the steering wheel is frequently a hindrance than a help. Typically, one has to twist his body sideways to use the adjacent seat as a work surface, or slide the driver's seat all the way back in hopes of gaining sufficient lap room to work with a computer. The associated discomfort and inconvenience discourage the timely recording of information, resulting in decreased productivity.

2. Description of Prior Art

The applicant is aware of several prior art, but none is considered particularly relevant to the instant invention. Gonsoulin in U.S. Pat. No. 4,909,159 disclosed a table structure that fits over the entire front passenger seat to provide a work surface for desk-top computer. It is very bulky in size and precludes carrying a front seat passenger. Frank and Jewel in U.S. Pat. No. 5,177,665 disclosed a computer housing that opens and closes substantially like an attaché case and attaches to the vehicle steering wheel by means of two exterior hooks. This invention positions the screen of the computer at chest level, which is too low, and limits the screen opening to little more than 90° relative to the keyboard, therefore rendering the viewing of the computer screen extremely difficult, if not impossible. The screen should ideally be at eye level relative to the driver, and be open between 135° to 160° relative to the keyboard. In addition, the keyboard juts out horizontally between the wheel and the user, creating a very cramped and uncomfortable milieu. It appears necessary to have to slide the driver's seat backwards to create elbow room each time this invention is used. Lastly, the mechanical fulcrum of the Frank and Jewel invention is such that tremendous stress would be placed in the vicinity of the hinge of the computer housing when the weight of the arms are placed against the housing in actual use. Douglas in U.S. Pat. No. 4,974,805 disclosed a clipboard with top and bottom flanges that engages the upper and lower portions of the steering wheel. No means of supporting a computing device is provided. Likewise, Easterly in U.S. Pat. No. 3,952,988 disclosed a steering wheel mounted desk board with a specially contoured mounting undersurface to protect against horn activation that is also not suitable for use in conjunction with a computing device. White in U.S. Pat. No. 4,726,607 disclosed a clipboard securable to a steering wheel by means of a top hook and a bottom strap. Like Douglas, it has no means of supporting a portable computer.

None of the prior art was designed to keep a portable computer from sliding off a slanted work surface, or to provide a comfortable wrist rest. Nor do any of them have provisions for variably adjusting the tilt angle of the work surface to accommodate for the different viewing angle limitations of different laptop computers, and optical interference from ambient lighting. Many laptop computers have screens that can open only to 135°, relative to the keyboard. The clarity of the flat panel screen is easily impaired by suboptimal viewing angle and by reflections from ambient light. Inside an automobile, typically only minimal shading from the sun is available. Depending on the time of day, bright sun light shining through the vehicle windows at variable angles all the more create suboptimal screen viewing conditions. Therefore a tilt adjustable feature is extremely important as it bears directly on the user's ability to view the screen clearly.

OBJECTS AND ADVANTAGES

It is an object of this invention to provide a new and improved versatile portable desk that overcomes the limitations and deficiencies of the prior art and allows a person to freely and comfortably use both hands on a computer keyboard while their computer is securely supported and positioned at the optimal height and angle against a steering wheel. It is also an object of the present invention to provide a desk for a vehicle operator that will universally fit all steering wheel sizes and allow for variable tilting of the work surface, is simple and quick to mount and dismount, economical to manufacture, and compact enough for under-seat storage.

SUMMARY OF THE INVENTION

The objects of this invention are provided in a new and improved portable computing work platform comprising a planar desk surface having a support ledge to support a laptop computer and a wrist rest at its lower end and a header piece at its upper end. The header piece has an elongated opening with rounded ends to accept and securely engage with the upper sector of a steering wheel. Along each of the lateral borders on the underside of the planar desk surface is a lattice work of uniformly spaced and horizontally aligned receptacle slots which are defined by a plurality of inwardly extending ribs. An elongated bar with a tongue which engages within the uniformly spaced receptacle slots allows for variable adjustment of the tilt angle of the planar desk surface.

BRIEF DESCRIPTION OF THE DRAWINGS

The invention will be better understood by reference to the accompanying drawings, wherein:

FIG. 11 is a perspective view of another embodiment of the instant invention, and FIG. 12 is a cross-section view of FIG. 11 taken along the line 12—12.

Figure 1:
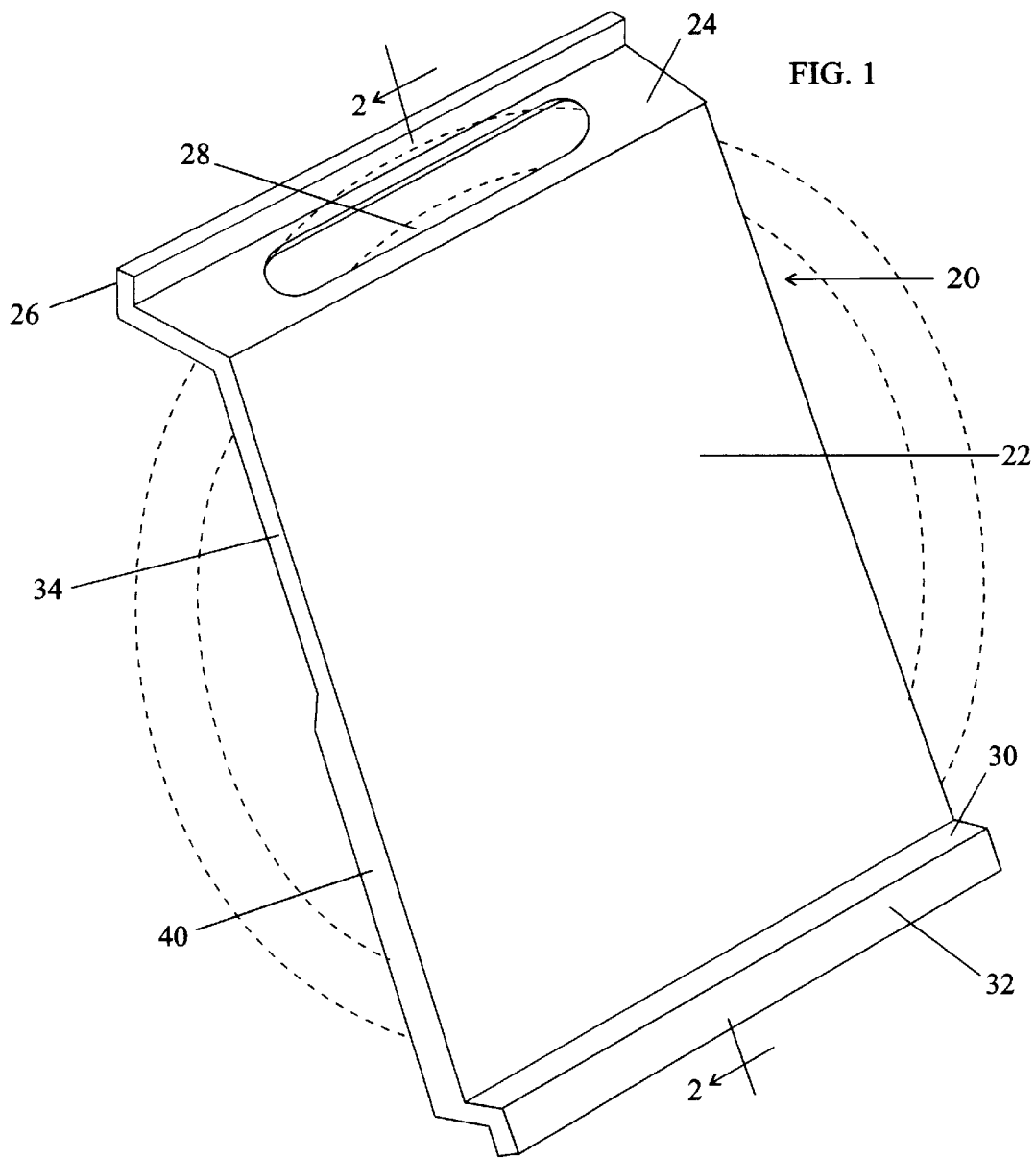
FIG. 1 is a perspective view showing the portable work platform in use over a steering wheel.

LIST OF REFERENCE NUMERALS:

20 portable computing work platform
22 base plate desk surface
24 header
26 header extension
28 oval opening
30 support ledge
32 wrist rest
34 narrow side flange
36 horizontal ribs
38 receptacle slots for tilt bar
40 wide side flange
42 tilt adjuster bar
44 tongue of the tilt adjuster bar
46 retention pins
48 contoured undersurface of oval aperture
50 reinforcing ribs

DETAILED DESCRIPTION OF PREFERRED EMBODIMENTS

Referring to the drawings, the portable computing work platform for vehicle operators is generally illustrated by reference numeral 20. This invention provides a convenient to use work surface which universally anchors over the top of any steering wheel. As shown in FIG. 1, this work platform 20 comprises a largely planar base plate 22 which forms the desk surface. At the upper end of the desk surface, the platform extends posteriorly to form a substantially horizontal header member 24. Within header 24 is a generally oval aperture 28, through which the top portion of a steering wheel, shown in dotted lines, engages. This aperture will securely engage with steering wheels of all sizes. An optional header extension 26 can extend vertically upward, as shown in FIG. 1, or downward from the posterior border of header 24, as shown in FIG. 11, to serve as reinforcement and as a handle. At the lower end of base plate desk surface 22 is a narrow horizontal support ledge 30 against which a laptop computer or similar device would rest. Extending at about 90° from support ledge 30 is wrist rest 32 which not only supports the wrists but protects them from the cutting pressure from the edge of the support ledge. A side flange with a narrow portion 34 and a wide portion 40 runs along the periphery to provide added rigidity and strength to the portable desk. Wide side-flanges 40 span each side of the lower half of base plate desk surface 22 to support a series of uniformly spaced and horizontally aligned ribs 36 (further explained in FIG. 4).

Figure 2:
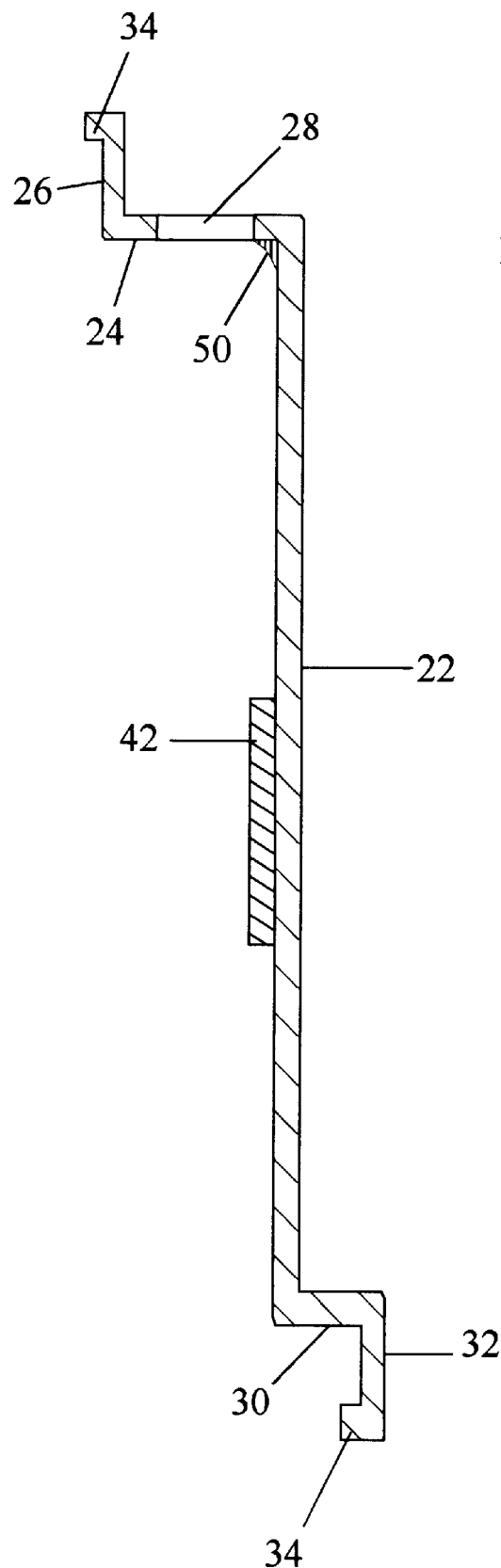
FIG. 2 is a cross-section view of FIG. 1 taken along the Line 2—2.

FIG. 2 is a cross section view of the center portion of the work platform taken along the line 2—2 in FIG. 1. Optional reinforcing ribs 50 are shown at a potential stress point. A cross section of a tilt adjustment bar 42 is shown.

Figure 3:
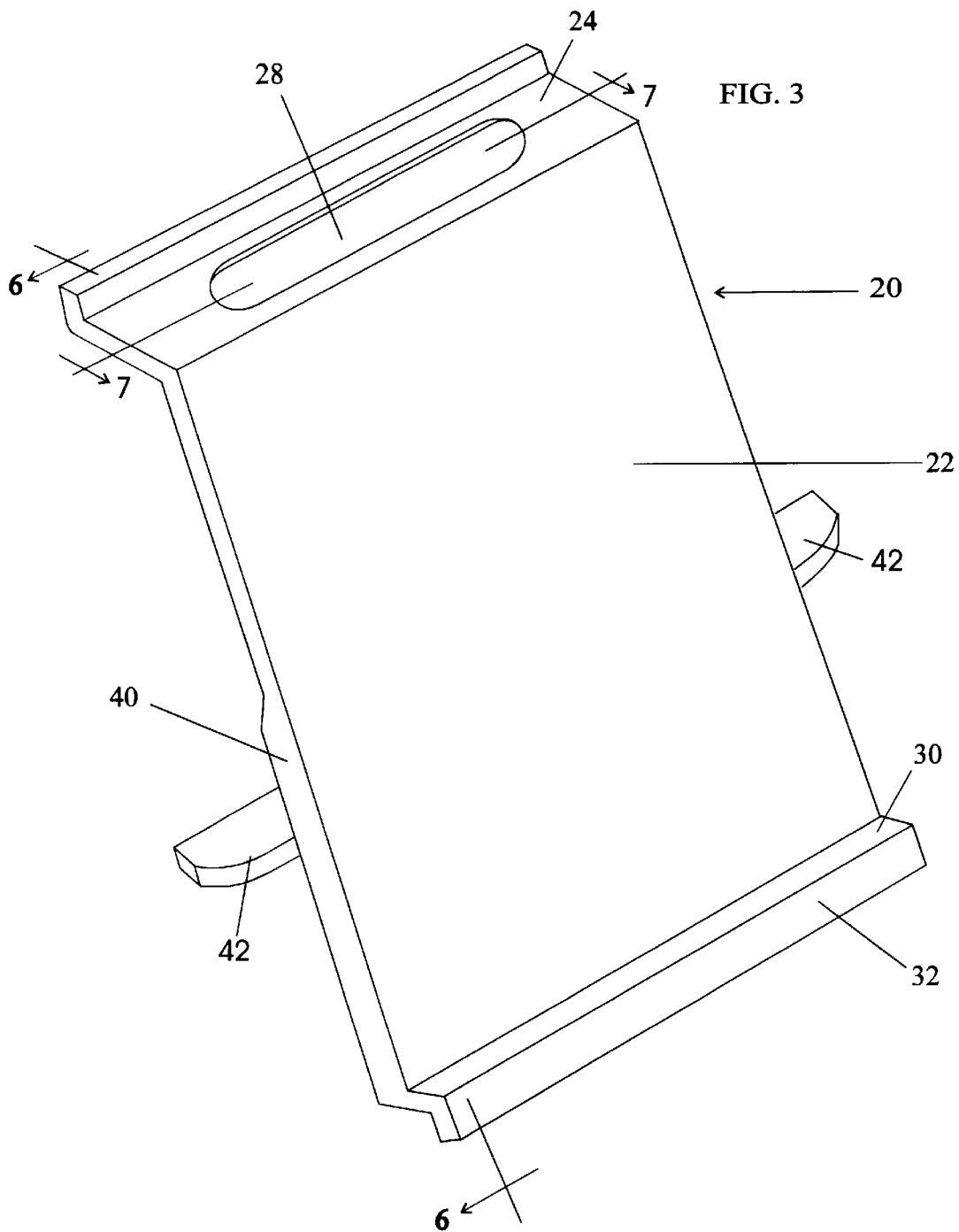
FIG. 3 is a perspective view showing the portable work platform with the tilt adjuster bar in use.

FIG. 3 shows the work platform with the tilt adjustment bar 42 in use. Because significant variations in size exist in the diameter of steering wheels from one type of vehicle to another, there will be some situations wherein the lower portion of work platform may fall into a large gap between the spokes of the wheel of service vehicles. The tilt bar is significantly longer than the width of the work platform and serves to prop the lower portion of the work platform over the rim of the wheel. Therefore, in addition to the tilt function, the tilt adjuster bar can also serve the important function of support and stabilization over a large steering wheel.

Figure 4:
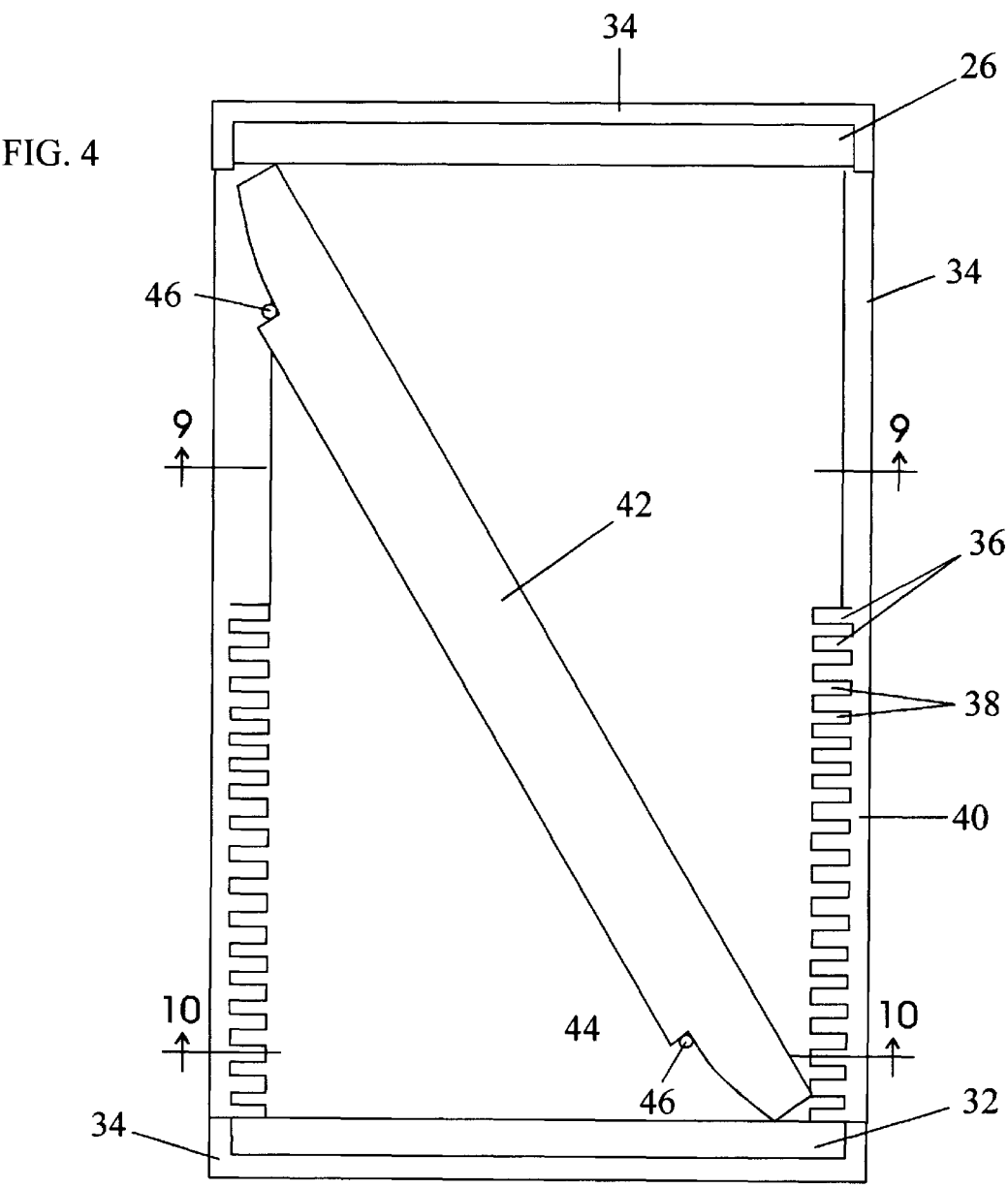
FIG. 4 is a bottom view of the underside of the portable work platform.
Figure 5:
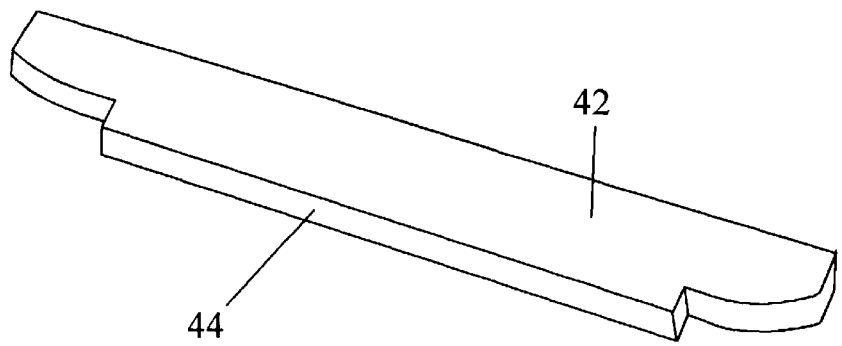
FIG. 5 is a perspective view of the variable tilt adjuster bar.

To understand how the bar is engaged with the work platform, refer to FIG. 4 which is a bottom view of the underside of the work platform. In FIG. 4, the tilt adjustment bar is in its storage position and is frictionally held in place by two retention pins 46. This unique storage position allows the tilt adjuster bar to be completely unobtrusive and out of the way when it is not in use. An alternative method to secure the tilt bar in storage includes the use of retention pins that engage through the body of the tilt bar itself. A series of uniformly spaced and horizontally aligned ribs 36 form receptacle slots 38 on each side of the undersurface of base plate desk surface 22. This lattice work of ribs extend from the bottom of the desk surface to about the mid-section and is laterally connected to and reinforced by the wider side flange 40. FIG. 5 is a perspective view of the tilt adjuster bar 42. It has a broad but short tongue 44 which can be inserted into any one pair of the horizontally aligned receptacle slots 38 on the underside of the work platform. The higher up the tilt adjuster bar is positioned, the greater the work platform is tilted toward horizontal. Users of laptop computers that do not open beyond 135° will especially benefit from using the tilt bar. The tilt adjusting feature of the instant invention provides an additional and substantial amount of variably adjustable tilt beyond the tilting from a tiltable steering wheel. When the tilt bar is inserted at a high position, maximum tilt is provided and the tilt adjuster bar serves as a fulcrum to the bending force created by the weight of the laptop computer as well as the weight of the forearms and hands of the computer user. To prevent stress flexing or bending of the desk surface under this circumstance, the wider side flanges 40 extend upward beyond where the horizontal ribs 36 end to allow for added structural strength. The use of the tilt adjuster bar is optional; when not in use, it is stored against the back of base plate desk surface 22 by means of two retention pins 46 which frictionally engage the bar at each side of the tongue 44.

Figure 6:
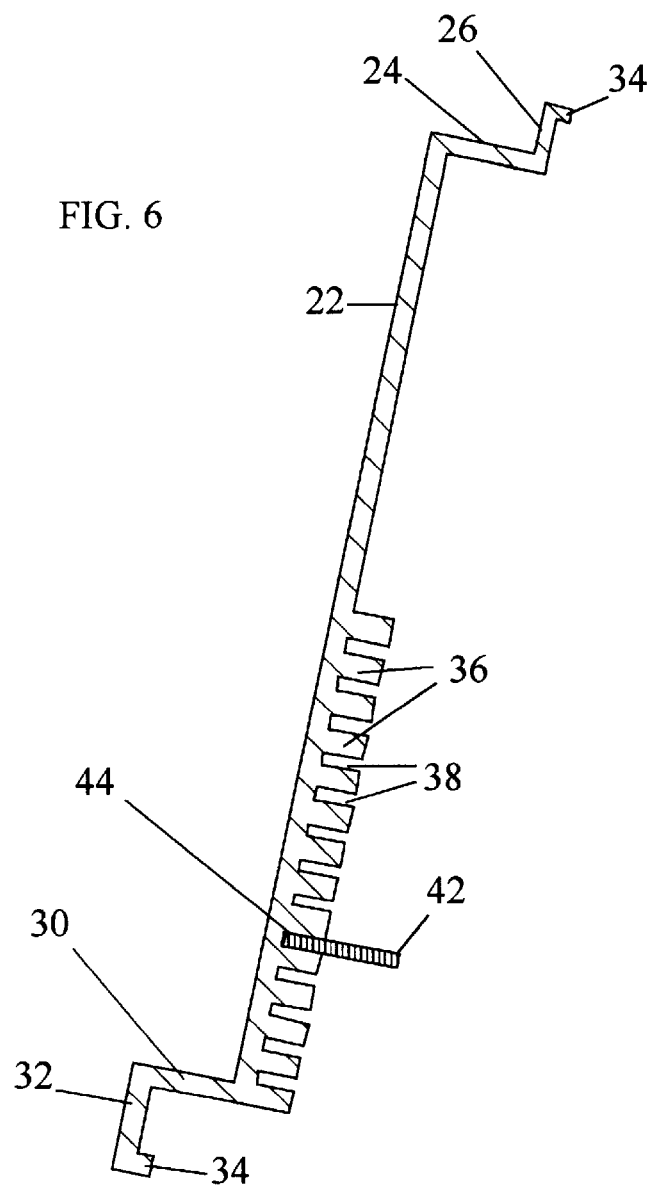
FIG. 6 is a cross section view of FIG. 3 taken along the line 6—6.

FIG. 6 shows a cross section view of FIG. 3 along the line 6—6. Each rib 36 is separated from its adjacent ribs by a receptacle slot 38 that will accept the tongue 44 of a tilt adjuster bar 42 by friction fit when the bar is inserted. The higher up the adjuster bar is inserted, the more the writing surface tilts toward the user, thus providing variable, yet sturdy tilt angle control.

Figure 7:
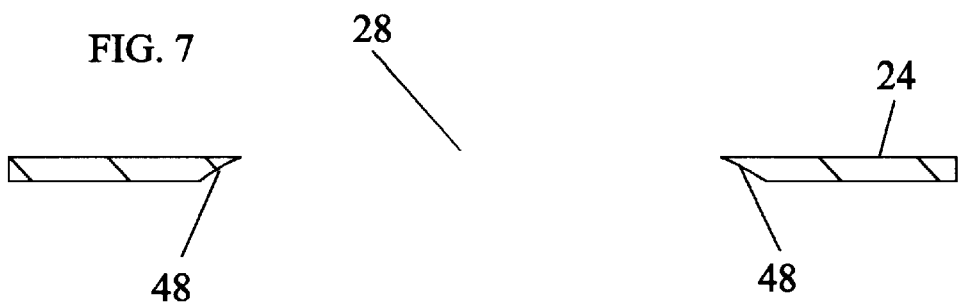
FIG. 7 is a cross sectional view of FIG. 3 taken along the line 7—7.

FIG. 7 is a cross sectional view of FIG. 3 along the line 7—7. Note that the underside of header 24 has contoured undersurfaces 48 on the lateral aspects of aperture 48 for better form fit against the steering wheel.

Figure 8:
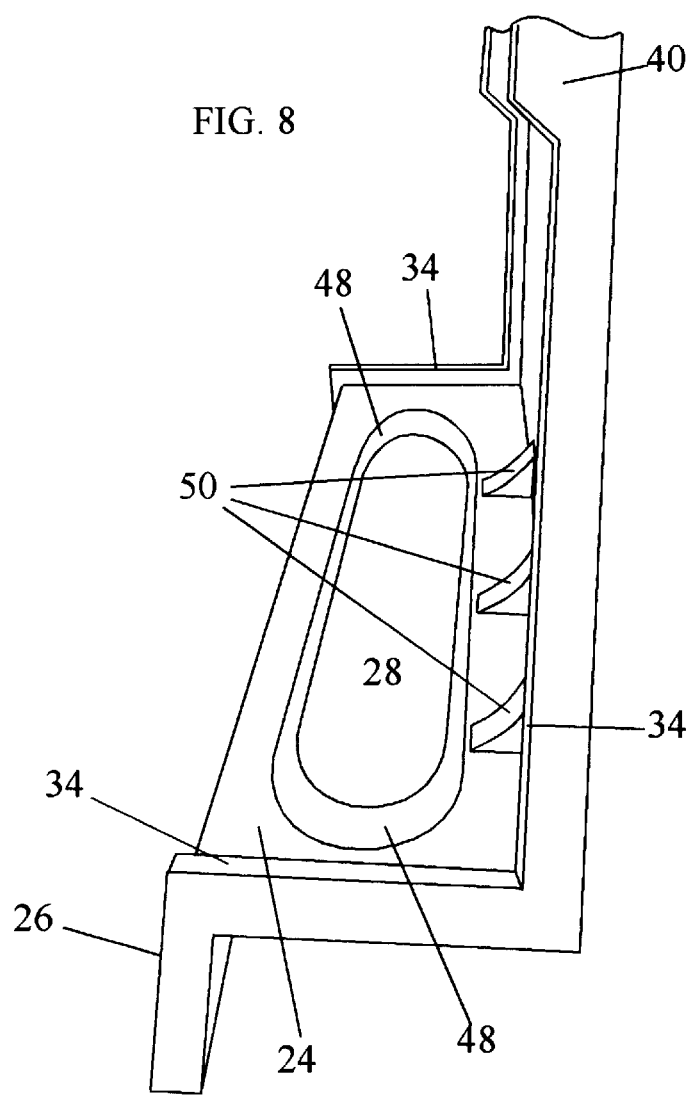
FIG. 8 is a perspective bottom view of the underside of the header. In this illustration, the work platform has been turned upside down on its longitudinal axis.

FIG. 8 is a perspective view of the underside of header 24. In this illustration, the desk has been turned upside down on its longitudinal axis. Three pairs of optional reinforcing ribs 50 are shown. The transition from a narrower side flange 34 to a wider side flange 40 near the header allows better conformity to the steering wheel without unduly increasing the depth of header 24.

Figure 9:
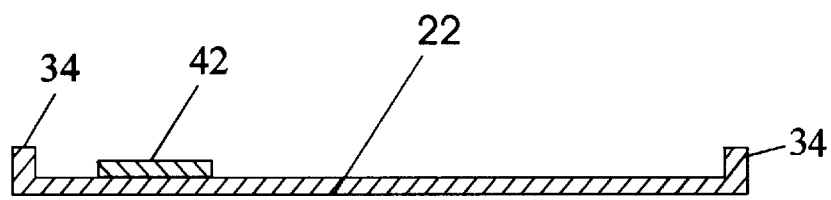
FIGS. 9 and 10 are cross section views of FIG. 4 taken along the lines 9—9 and 10—10 respectively.
Figure 10:
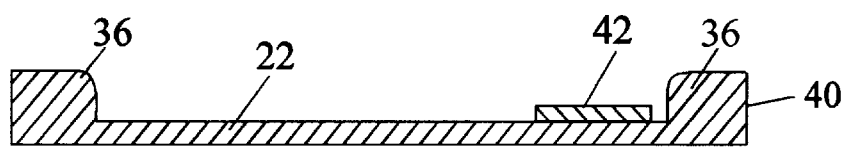

FIGS. 9 and 10 are cross section views of FIG. 4 taken along the lines 9—9 and 10—10 respectively to further illustrate the narrower and wider side flanges 34 and 40, and the relative width of the ribs 36 that keep the tilt adjuster bar in place.

FIG. 11 is a perspective view of another embodiment showing the header extension 26 in the direction of the wrist rest. FIG. 12 is a cross section view of FIG. 11 taken along the line 12—12.

From the foregoing description, those skilled in the art will appreciate that the present invention provides a uniquely versatile work platform for use in a vehicle. Those skilled in the art will also appreciate the ease with which the platform can be mounted and adjusted as needed to accommodate the special and individual needs of the mobile computing professional.

Although the present invention has been described with a certain degree of particularity, it is understood that this disclosure has been made by way of example and that changes in details of structure may be made without departing from the spirit thereof. Hence, it should be apparent that the header extension 26 can either extend up, down, or even horizontally for reinforcement, if desired, around the oval aperture 28. Alternatively, the entire header extension 26 is optional. Even the oval aperture need not be circumferentially surrounded by structural matter; the portion that constitutes the posterior rim of the oval aperture can be eliminated to create a C-shaped opening that alone can serve the anchoring function to the steering wheel. Instead of base plate support means comprising receptacle slots 38 formed by ribs 36, other receptacle means can be formed by other structures including rows of retention pins. The work platform can be substantially enlarged to become a work center capable of supporting and securing multiple pieces of equipment including printer, calculator, cellular phone, etc. The work platform can be made of wood, metal, polymeric material or a combination thereof, and depending on the material and the degree of rigidity or strength desired, side flanges 34 and 40 may be deleted, or further reinforced by a variety of ways. Other reinforcement structures such as ribs and angles can be added as desired.

Likewise, other modifications such as removing a center portion of the wrist rest, and/or creating a hole in the center of the support ledge to accommodate lap top computers that have a track ball centered about the leading edge of the computer, are possible and should be apparent to those skilled in the art. The support ledge may be horizontal or curved upward slightly in order to better conform and cradle those laptop computers that have a significantly curved leading edge. The addition of clip means and pen holding means, or the provision of tilt-adjusting ribs up and down the back of the entire platform, are also possible. The distance between the header 24 and the supporting ledge 30 can also be made variably adjustable by separating one or the other from the base plate desk surface 22 and making it attach to the sides of the base plate via one of a number of C-shaped compression mechanisms. Thus, header 24 and support ledge 30 are then slidably and adjustably received on the base plate 22. This in turn allows the level at which the lap top computer rests to be raised or lowered.

The application of this device is not limited to land vehicles and can for example be effectively extended to surface vessels that have a steering wheel. It is to be emphasized, of course, that this invention is not intended to be used by a driver while the vehicle is in motion, but only when the vehicle is stopped and securely parked in a safe location.

The instant invention is also usable as a conventional work platform for ordinary writing. In the office, it is useful as a copy holder, or when laid down on a desk serves as a slanted cradle for a laptop computer, calculator or other office equipment to facilitate their use. Unlike desktop computer keyboards, many laptop computers do not come equipped with adjustable feet to tilt the keyboard. The instant invention enables that function when the laptop computer is placed upon it on a desk.

Even though many advantages and characteristics of the present invention have been described and set forth herein, together with details relating to the structure and function of the invention, the disclosure herein is illustrative only. It is anticipated by this invention that various modifications can be made as desired, some of which have been discussed in the preceding paragraphs.

Hence the present invention is not limited in its application to the details of the construction and to the arrangement of the different components set forth in this disclosure or illustrated in the drawings, as it is capable of other embodiment and of being practiced and carried out in various ways. It will be readily understood by those skilled in the art that changes may be made in form and detail, especially in matters of shape, size and arrangement of parts and aggregation of functional units, and in the use of functional equivalents and substitutes.

I claim:

1. A work platform for use in vehicles and adapted for support by the steering wheel of a vehicle, comprising:

a base plate having a substantially planar desk surface;

a header plate extending substantially orthogonally from said base plate at a first end thereof, said header plate having an opening therein adapted for receiving a sector of a steering wheel;

a support ledge extending from said base plate at a second end of said base plate opposite said first end, said support ledge providing a retention means for articles placed upon said desk surface;

a side flange extending along each of a pair of opposed sides of said base; and base support means for interposition between said base plate and the steering wheel, said base support means bracing and maintaining said base plate away from said steering wheel, said base support means comprising a bar adapted for positionally adjustable interposition between said side flanges.

2. The work platform according to claim 1, wherein said bar is stored against the underside of the base plate by friction means.

3. The work platform according to claim 2, wherein said bar is configured to be frictionally engaged by at least one retention pin extending from the under-surface of the base plate.

4. The work platform according to claim 1, wherein said side flanges each have a plurality of receptacle slots connected therein, said receptacle slots receiving and maintaining said bar.

5. The work platform according to claim 4, wherein said slots are uniformly spaced along said side flanges, with said slots of one side flange being aligned with said slots of said other side flange.

6. The work platform according to claim 1, wherein said base support means comprises at least one receptacle means for engaging and maintaining said bar.

7. The work platform according to claim 6, wherein said bar is maintained in said receptacle slots by a friction fit.

* * * * *